United States Patent
Hanna et al.

(10) Patent No.: US 9,534,651 B2
(45) Date of Patent: Jan. 3, 2017

(54) METHOD OF MANUFACTURING A DAMPED PART

(75) Inventors: Michael D. Hanna, West Bloomfield, MI (US); Mohan Sundar, Troy, MI (US); James G. Schroth, Troy, MI (US); Thomas C. Zebehazy, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1220 days.

(21) Appl. No.: 11/780,679

(22) Filed: Jul. 20, 2007

(65) Prior Publication Data

US 2009/0022938 A1 Jan. 22, 2009

(51) Int. Cl.
| | |
|---|---|
| *B23K 20/12* | (2006.01) |
| *F16F 7/00* | (2006.01) |
| *F16D 65/00* | (2006.01) |
| *F16D 65/12* | (2006.01) |
| *F16D 65/02* | (2006.01) |

(52) U.S. Cl.
CPC ............. *F16F 7/00* (2013.01); *F16D 65/0006* (2013.01); *F16D 65/0012* (2013.01); *F16D 65/12* (2013.01); *F16D 2065/132* (2013.01); *F16D 2065/1328* (2013.01); *Y10T 29/49826* (2015.01); *Y10T 428/24025* (2015.01)

(58) Field of Classification Search
CPC ...... F16D 65/12; F16D 65/0006; F16D 69/00; B23K 20/12; B23K 2201/04
USPC ............................ 228/112.1, 114.5, 115, 113
See application file for complete search history.

(56) References Cited

U.S. PATENT DOCUMENTS

| | | | |
|---|---|---|---|
| 974,024 A | 10/1910 | Carter | |
| 1,484,421 A | 2/1924 | Thomspon | |
| 1,989,211 A | 1/1935 | Norton | |
| 2,012,838 A | 8/1935 | Tilden | |
| 2,026,878 A | 1/1936 | Farr | |
| 2,288,438 A | 6/1942 | Dach | |
| 2,603,316 A | 7/1952 | Pierce | |
| 2,978,793 A * | 4/1961 | Lamson et al. ............. | 29/898.1 |
| 3,085,391 A | 4/1963 | Hatfield et al. | |
| 3,127,959 A | 4/1964 | Wengrowski | |
| 3,147,828 A | 9/1964 | Hunsaker | |
| 3,292,746 A | 12/1966 | Robinette | |
| 3,378,115 A | 4/1968 | Stephens, III | |
| 3,425,523 A | 2/1969 | Robinette | |

(Continued)

FOREIGN PATENT DOCUMENTS

| | | |
|---|---|---|
| CH | 428319 A | 1/1967 |
| CN | 20051113784 A | 10/2005 |

(Continued)

OTHER PUBLICATIONS

Computer english translation of JP 2002174281 A.*

(Continued)

*Primary Examiner* — Erin Saad
(74) *Attorney, Agent, or Firm* — BrooksGroup

(57) ABSTRACT

One embodiment includes a damped product including a first portion, a second portion, a first cavity formed in one of the first portion or the second portion, and a frictional damping insert at least partially received in the first cavity so that the first portion and the second portion completely enclose the frictional damping insert and so that vibration of the product is damped by the insert.

35 Claims, 8 Drawing Sheets

(56) References Cited

U.S. PATENT DOCUMENTS

| | | | |
|---|---|---|---|
| 3,506,311 A | * | 4/1970 | Nobach .................... 301/63.105 |
| 3,509,973 A | | 5/1970 | Kimata |
| 3,575,270 A | | 4/1971 | Reinbek et al. |
| 3,774,472 A | | 11/1973 | Mitchell |
| 3,841,448 A | | 10/1974 | Norton, Jr. |
| 3,975,894 A | | 8/1976 | Suzuki |
| 4,049,085 A | | 9/1977 | Blunier |
| 4,072,219 A | | 2/1978 | Hahm et al. |
| 4,195,713 A | | 4/1980 | Hagbjer et al. |
| 4,250,950 A | | 2/1981 | Buxmann et al. |
| 4,278,153 A | | 7/1981 | Venkatu |
| 4,338,758 A | | 7/1982 | Hagbjer |
| 4,379,501 A | | 4/1983 | Hagiwara et al. |
| 4,475,634 A | | 10/1984 | Flaim et al. |
| 4,523,666 A | | 6/1985 | Murray |
| 4,529,079 A | | 7/1985 | Albertson |
| 4,585,691 A | * | 4/1986 | Nishimura et al. ........... 442/379 |
| 4,905,299 A | | 2/1990 | Ferraiuolo et al. |
| 5,004,078 A | | 4/1991 | Oono et al. |
| 5,025,547 A | | 6/1991 | Sheu et al. |
| 5,083,643 A | | 1/1992 | Hummel et al. |
| 5,115,891 A | | 5/1992 | Raitzer et al. |
| 5,139,117 A | | 8/1992 | Melinat |
| 5,143,184 A | | 9/1992 | Snyder et al. |
| 5,183,632 A | | 2/1993 | Kluchi et al. |
| 5,184,662 A | | 2/1993 | Quick et al. |
| 5,259,486 A | | 11/1993 | Deane |
| 5,310,025 A | | 5/1994 | Anderson |
| 5,416,962 A | | 5/1995 | Passarella |
| 5,417,313 A | | 5/1995 | Matsuzaki et al. |
| 5,509,510 A | | 4/1996 | Ihm |
| 5,530,213 A | | 6/1996 | Hartsock et al. |
| 5,582,231 A | | 12/1996 | Siak et al. |
| 5,620,042 A | | 4/1997 | Ihm |
| 5,660,251 A | | 8/1997 | Nishizawa et al. |
| 5,789,066 A | | 8/1998 | DeMare et al. |
| 5,819,882 A | | 10/1998 | Reynolds et al. |
| 5,855,257 A | | 1/1999 | Wickert et al. |
| 5,862,892 A | | 1/1999 | Conley |
| 5,878,843 A | | 3/1999 | Saum |
| 5,927,447 A | | 7/1999 | Dickerson |
| 5,965,249 A | | 10/1999 | Sutton et al. |
| 6,047,794 A | | 4/2000 | Nishizawa |
| 6,073,735 A | | 6/2000 | Botsch et al. |
| 6,112,865 A | | 9/2000 | Wickert et al. |
| 6,206,150 B1 | | 3/2001 | Hill |
| 6,216,827 B1 | | 4/2001 | Ichiba et al. |
| 6,223,866 B1 | | 5/2001 | Giacomazza |
| 6,231,456 B1 | | 5/2001 | Rennie et al. |
| 6,241,055 B1 | | 6/2001 | Daudi |
| 6,241,056 B1 | | 6/2001 | Cullen et al. |
| 6,283,258 B1 | | 9/2001 | Chen et al. |
| 6,302,246 B1 | | 10/2001 | Naumann et al. |
| 6,357,557 B1 | * | 3/2002 | Di Ponio .................... 188/18 A |
| 6,405,839 B1 | | 6/2002 | Ballinger et al. |
| 6,465,110 B1 | | 10/2002 | Boss et al. |
| 6,481,545 B1 | | 11/2002 | Yano et al. |
| 6,505,716 B1 | | 1/2003 | Daudi et al. |
| 6,507,716 B2 | | 1/2003 | Nomura et al. |
| 6,543,518 B1 | | 4/2003 | Bend et al. |
| 6,648,055 B1 | | 11/2003 | Haug et al. |
| 6,732,846 B2 | * | 5/2004 | Diemer et al. ........... 192/107 R |
| 6,799,664 B1 | | 10/2004 | Connolly |
| 6,880,681 B2 | | 4/2005 | Koizumi et al. |
| 6,890,218 B2 | | 5/2005 | Patwardhan et al. |
| 6,899,158 B2 | | 5/2005 | Matuura et al. |
| 6,932,917 B2 | | 8/2005 | Golden et al. |
| 6,945,309 B2 | | 9/2005 | Frait et al. |
| 7,066,235 B2 | | 6/2006 | Huang |
| 7,112,749 B2 | | 9/2006 | DiPaola et al. |
| 7,178,795 B2 | | 2/2007 | Huprikar et al. |
| 7,293,755 B2 | | 11/2007 | Miyahara et al. |
| 7,594,568 B2 | | 9/2009 | Hanna et al. |
| 7,604,098 B2 | | 10/2009 | Dessouki et al. |
| 7,644,750 B2 | | 1/2010 | Schroth et al. |
| 7,775,332 B2 | | 8/2010 | Hanna et al. |
| 7,836,938 B2 | | 11/2010 | Agarwal et al. |
| 2002/0084156 A1 | | 7/2002 | Ballinger et al. |
| 2002/0104721 A1 | | 8/2002 | Schaus et al. |
| 2003/0037999 A1 | | 2/2003 | Tanaka et al. |
| 2003/0127297 A1 | | 7/2003 | Smith et al. |
| 2003/0141154 A1 | | 7/2003 | Rancourt et al. |
| 2003/0213658 A1 | | 11/2003 | Baba |
| 2004/0031581 A1 | | 2/2004 | Herreid et al. |
| 2004/0043193 A1* | | 3/2004 | Chen et al. .................... 428/143 |
| 2004/0045692 A1 | | 3/2004 | Redemske |
| 2004/0074712 A1 | | 4/2004 | Quaglia et al. |
| 2004/0084260 A1 | | 5/2004 | Hoyte et al. |
| 2004/0242363 A1 | | 12/2004 | Kohno et al. |
| 2005/0011628 A1 | | 1/2005 | Frait et al. |
| 2005/0150222 A1 | | 7/2005 | Kalish et al. |
| 2005/0183909 A1 | | 8/2005 | Rau, III et al. |
| 2005/0189194 A1* | | 9/2005 | Lindauer et al. .......... 192/58.61 |
| 2005/0193976 A1 | | 9/2005 | Suzuki et al. |
| 2006/0076200 A1 | | 4/2006 | Dessouki et al. |
| 2006/0241207 A1* | | 10/2006 | Lam et al. .................... 523/149 |
| 2006/0243547 A1 | | 11/2006 | Keller |
| 2007/0039710 A1 | | 2/2007 | Newcomb |
| 2007/0056815 A1 | | 3/2007 | Hanna et al. |
| 2007/0062664 A1 | | 3/2007 | Schroth et al. |
| 2007/0062768 A1 | | 3/2007 | Hanna et al. |
| 2007/0142149 A1 | | 6/2007 | Kleber |
| 2007/0166425 A1 | | 7/2007 | Utsugi |
| 2007/0235270 A1 | | 10/2007 | Miskinis et al. |
| 2007/0298275 A1 | | 12/2007 | Carter et al. |
| 2008/0099289 A1 | | 5/2008 | Hanna et al. |
| 2008/0185249 A1 | | 8/2008 | Schroth et al. |
| 2009/0032569 A1 | | 2/2009 | Sachdev et al. |
| 2009/0107787 A1 | | 4/2009 | Walker et al. |

FOREIGN PATENT DOCUMENTS

| | | | |
|---|---|---|---|
| CN | 1757948 A | | 4/2006 |
| CN | 2863313 Y | | 1/2007 |
| DE | 24 46 938 | | 4/1976 |
| DE | 2446938 A1 | | 4/1976 |
| DE | 25 37 038 | | 3/1977 |
| DE | 2537038 A1 | | 3/1977 |
| DE | 19649919 A1 | | 6/1998 |
| DE | 199 48 009 | | 3/2001 |
| DE | 19948009 C1 | | 3/2001 |
| DE | 60000008 T2 | | 3/2002 |
| DE | 101 41 698 | | 3/2003 |
| DE | 10141698 A1 | | 3/2003 |
| DE | 102005048258 A1 | | 4/2006 |
| DE | 60116780 T2 | | 11/2006 |
| EP | 0 205 713 | | 12/1986 |
| EP | 0205713 A1 | | 12/1986 |
| GB | 1230 274 | | 4/1971 |
| GB | 1230274 | | 4/1971 |
| GB | 2328952 | | 3/1999 |
| JP | 57154533 | | 9/1982 |
| JP | 57154533 A | | 9/1982 |
| JP | 1126434 U1 | | 8/1989 |
| JP | 05-104567 | | 4/1993 |
| JP | 11342461 A | | 12/1999 |
| JP | 2001512763 T | | 8/2001 |
| JP | 2002174281 A | * | 6/2002 |
| JP | 2003214465 A | | 7/2003 |
| JP | 2004011841 A | | 1/2004 |
| KR | 20010049837 A | | 6/2001 |
| WO | 9823877 A1 | | 6/1998 |
| WO | WO 98/23877 | | 6/1998 |
| WO | 0136836 A1 | | 5/2001 |
| WO | WO 01/36836 | | 5/2001 |
| WO | 2007035206 A2 | | 3/2007 |

OTHER PUBLICATIONS

International Search Report dated Apr. 2, 2007 for International Application No. PCT US06/29687, Publication No. WO 2007/040768; GM Global Technology Operations, Inc.

(56) References Cited

OTHER PUBLICATIONS

Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.
Z. Wu, C. Richter, L. Menon, A Study of Anodization Process During Pore Formation in Nanoporous Alumina Templates, Journal of the Electrochemical Society, vol. 154, 2007.
W.-J. Lee, M. Alhoshan, W.H. Smyrl, Titanium Dioxide Nanotube Arrays Fabricated by Anodizing Processes, Journal of the Electrochemical Society, vo. 153, 2006, pp. B499-B505.
I.V. Sieber, P. Schmuki, Porous Tantalum Oxide Prepared by Electrochemical Anodic Oxidation, Journal of the Electrochemical Society, vol. 152, 2005, pp. C639-C644.
H. Tanaka, A. Shimada, A. Kinoshita, In situ Measurement of the Diameter of Nanopores in Silicon During Anodization in Hydrofluoric Acid Solution, Journal of the Electrochemic.
L.G. Hector, Jr., S. Sheu, Focused Energy Beam Work Roll Surface Texturing Science and Technology, Journal of Materials Processing & Manufacturing Science, vol. 2, Jul. 1993.
P.N. Anyalebechi, Ungrooved Mold Surface Topography Effects on Cast Subsurface Microstructure, Materials Processing Fundamentals, TMS 2007, pp. 49-62.
F. Yigit, Critical Wavelengths for Gap Nucleation in Solidification—Part 1: Theoretical Methodology, Journal of Applied Mechanics, vol. 67, Mar. 2000, pp. 66-76.
P.N. Anyalebechi, Undulatory Solid Shell Growth of Aluminum Alloy 3003 as a Function of the Wavelength of a Grooved Mold Surface Topography, TMS 2007, pp. 31-47.
Dessouki et al., U.S. Appl. No. 10/961,813, Coulumb friction damped disc brake rotors, filed Oct. 8, 2004.
Hanna et al., U.S. Appl. No. 11/475,756, Bi-metal disc brake rotor and method of manufacturing, filed Jun. 27, 2006.
Schroth et al., U.S. Appl. No. 11/475,759, Method of casting components with inserts for noise reduction, filed Jun. 27, 2006.
Schroth et al., U.S. Appl. No. 12/025,967, Damped products and methods of making and using the same, filed Feb. 5, 2008.
Hanna et al., U.S. Appl. No. 11/440,916, Bi-metal disc brake rotor and method of manufacture, filed May 25, 2006.
Hanna et al., U.S. Appl. No. 11/554,234, Coulomb damped disc brake rotor and method of manufacturing, filed Oct. 30, 2006.
Walker et al., U.S. Appl. No. 11/926,798, Inserts with holes for damped products and methods of making and using the same, filed Oct. 29, 2007.
Hanna et al., U.S. Appl. No. 11/832,401, Damped product with insert and method of making the same, filed Aug. 1, 2007.
Kleber, et al., U.S. Appl. No. 11/848,732, Cast-in-place torsion joint, filed Aug. 31, 2007.
Hanna et al., U.S. Appl. No. 11/780,679, Method of manufacturing a damped part, filed Jul. 20, 2007.
Aase et al., U.S. Appl. No. 11/969,259, Method of forming casting with frictional damping insert, filed Jan. 4, 2008.
Hanna et al., U.S. Appl. No. 12/165,729, Method for securing an insert in the manufacture of a damped part, filed Jul. 1, 2008.
Hanna et al., U.S. Appl. No. 12/165,731, Product with metallic foam and method of manufacturing the same, filed Jul. 1, 2008.
Agarwal et al., U.S. Appl. No. 11/860,049, Insert with tabs and damped products and methods of making the same, filed Sep. 24, 2007.
Hanna et al., U.S. Appl. No. 12/174,163, Damped part, filed Jul. 16, 2008.
Hanna et al., U.S. Appl. No. 12/174,223, Method of casting damped part with insert, filed Jul. 16, 2008.
Hanna et al., U.S. Appl. No. 12/183,180, Casting noise-damped, vented brake rotors with embedded inserts, filed Jul. 31, 2008.
Hanna et al., U.S. Appl. No. 12/183,104, Low mass multi-piece sound damped article, filed Jul. 31, 2008.
Golden et al., U.S. Appl. No. 12/105,411, Insert with filler to dampen vibrating components, filed Apr. 18, 2008.
Hanna et al., U.S. Appl. No. 11/440,893, Rotor assembly and method, filed May 25, 2006.
Carter, U.S. Appl. No. 11/680,179, Damped automotive components with cast in place inserts and method of making same, filed Feb. 28, 2007.
Ulicny et al., U.S. Appl. No. 12/105,438, Filler material to dampen vibrating components, filed Apr. 18, 2008.
Hanna et al., U.S. Appl. No. 12/272,164, Surface configurations for damping inserts, filed Nov. 17, 2008.
Hanna et al., U.S. Appl. No. 12/145,169, Damped product with an insert having a layer including graphite thereon and methods of making and using the same, filed Jun. 24, 2008.
Lowe et al., U.S. Appl. No. 12/174,320, Damped part with insert, filed Jul. 16, 2008.
Xia, U.S. Appl. No. 12/858,596, Lightweight brake rotor and components with composite materials, filed Sep. 20, 2007.
Dessouki et al., U.S. Appl. No. 12/178,872, Friction damped brake drum, filed Jul. 24, 2008.
Sachdev et al., U.S. Appl. No. 11/832,356, Friction welding method and products made using the same, filed Aug. 1, 2007.
Chinese First Office Action; CN200510113784.X; Dated May 18, 2007; 19 pages.
Chinese Second Office Action; CN200510113784.X; Dated Feb. 15, 2008; 13 pages.
German Examination Report; DE102005048258.9-12; Dated Oct. 22, 2007; 8 pages.
Gerdemann, Steven J,; Titanium Process Technologies; Advanced Materials & Processes, Jul. 2001, pp. 41-43.
Mahoney, M. W. & Lynch S. P.; Friction-Stir Processing; 15 pages.
MPIF: All You Need to Know about Powder Metallurgy; http://www.mpif.org/IntroPM/intropm/asp?linkid=1; 8 pages.
Powder Metallurgy—Wikipedia article; http://en.wikipedia.org/wiki/Powder_metallurgy; 5 pages, Jun. 19, 2008.
Sintering—Wikipedia article; http://en.wikipedia.org/wiki/Sintering; 2 pages, Jun. 19, 2008.
Magnetorheological fluid—Wikipedia article; http:en/wikipedia.org/wiki/Magnetorheological_fluid, Nov. 6, 2007.
PCT/US2008/087354 Written Opinion and Search Report; Date of Mailing: Aug. 3, 2009; 9 pages.
PCT/US2009/039839 Written Opinion and Search Report; Date of Mailing: Nov. 24, 2009; 7 pages.
PCT/US2009/048424 Written Opinion and Search Report; Date of Mailing; Dec. 28, 2009; 7 pages.
U.S. Appl. No. 12/328,989, filed Dec. 5, 2008; First Named Inventor: Patrick J. Monsere.
U.S. Appl. No. 12/420,259, filed Apr. 8, 2009; First Named Inventor: Michael D. Hanna.
U.S. Appl. No. 12/434,057, filed May 1, 2009; First Named Inventor: Chongmin Kim.
U.S. Appl. No. 12/436,830, filed May 7, 2009; First Named Inventor: James G. Schroth.
U.S. Appl. No. 12/489,901, filed Jun. 23, 2009; First Named Inventor: Michael D. Hanna.
U.S. Appl. No. 12/885,813, filed Sep. 20, 2010; First Named Inventor: Michael D. Hanna.

* cited by examiner

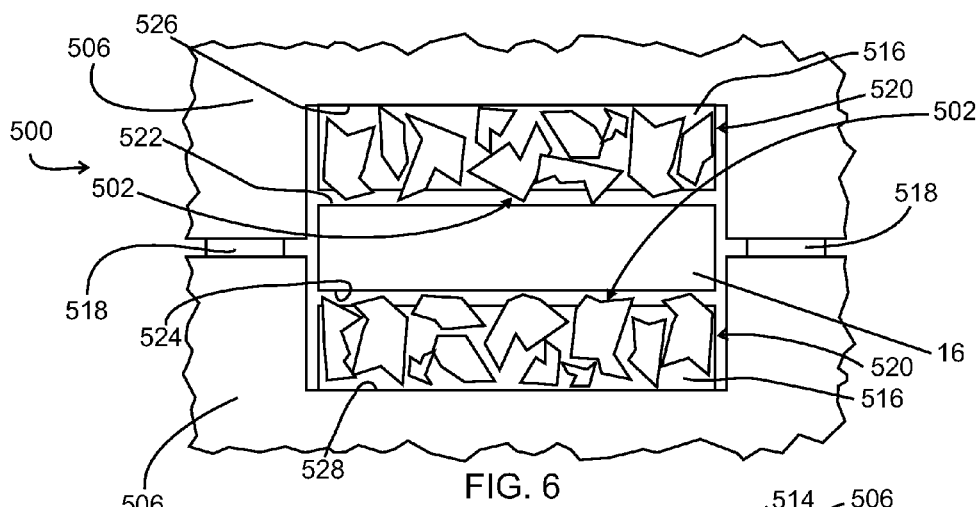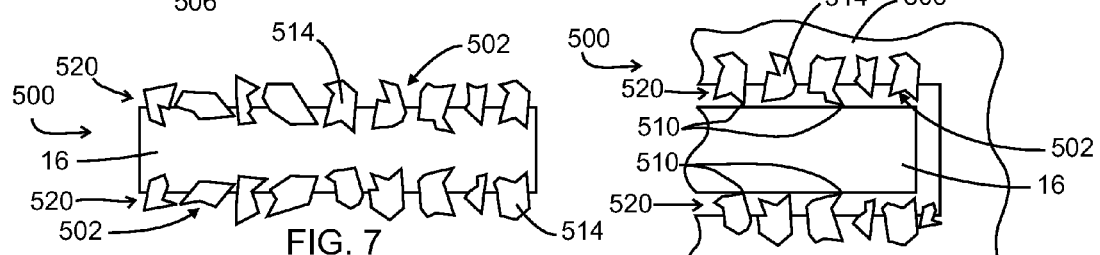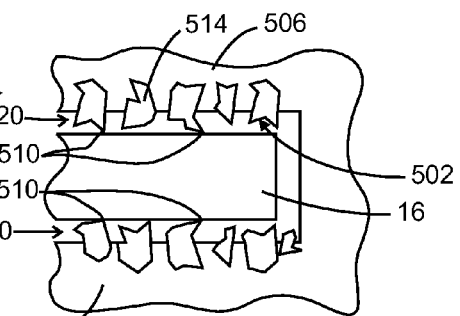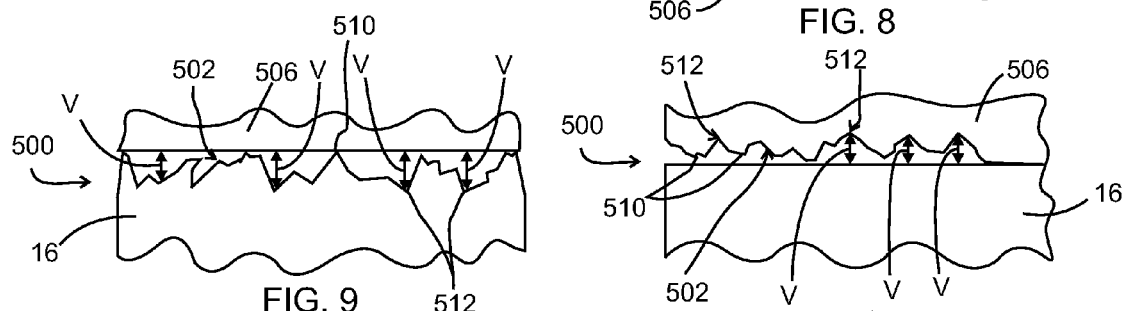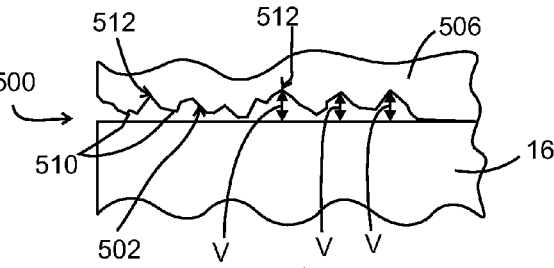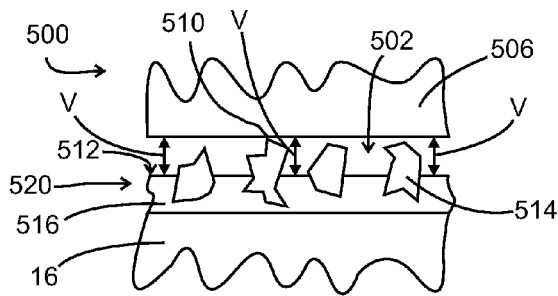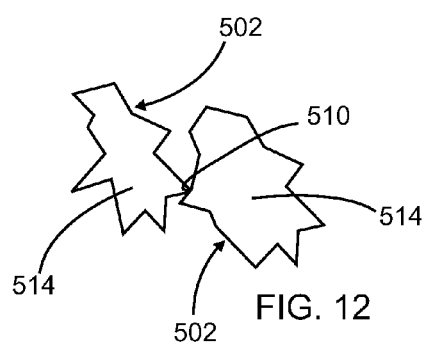

METHOD OF MANUFACTURING A DAMPED PART

TECHNICAL FIELD

The field to which the disclosure generally relates includes damped products and methods of making the same.

BACKGROUND

Parts subjected to vibration may produce unwanted or undesirable vibrations. Similarly, a part or component may be set into motion at an undesirable frequency and/or amplitude and for a prolonged period. For example, parts such as brake rotors, brackets, pulleys, brake drums, transmission housings, gears, and other parts may contribute to noise that gets transmitted to the passenger compartment of a vehicle. In an effort to reduce the generation of this noise and thereby its transmission into the passenger compartment, a variety of techniques have been employed, including the use of polymer coatings on engine parts, sound absorbing barriers, and laminated panels having visco elastic layers. The undesirable vibrations in parts or components may occur in a variety of other products including, but not limited to, sporting equipment, household appliances, manufacturing equipment such as lathes, milling/grinding/drilling machines, earth moving equipment, other nonautomotive applications, and components that are subject to dynamic loads and vibration. These components can be manufactured through a variety of means including casting, machining, forging, die-casting, etc.

SUMMARY OF EXEMPLARY EMBODIMENTS OF THE INVENTION

One embodiment includes a damped product including a first portion, a second portion, a first cavity formed in one of the first portion or the second portion, and a frictional damping insert at least partially received in the first cavity so that the first portion and the second portion completely enclose the frictional damping insert and so that vibration of the product is damped by the insert.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 6 is a sectional view with portions broken away of one embodiment of the invention;

FIG. 7 is an enlarged view of one embodiment of the invention;

FIG. 8 is a sectional view with portions broken away of one embodiment of the invention;

FIG. 9 is an enlarged sectional view with portions broken away of one embodiment of the invention;

FIG. 10 is an enlarged sectional view with portions broken away of one embodiment of the invention;

FIG. 11 is an enlarged sectional view with portions broken away of one embodiment of the invention;

FIG. 12 illustrates one embodiment of the invention;

DETAILED DESCRIPTION OF EXEMPLARY EMBODIMENTS

The following description of the embodiment(s) is merely exemplary in nature and is in no way intended to limit the invention, its application, or uses.

Figure 1:
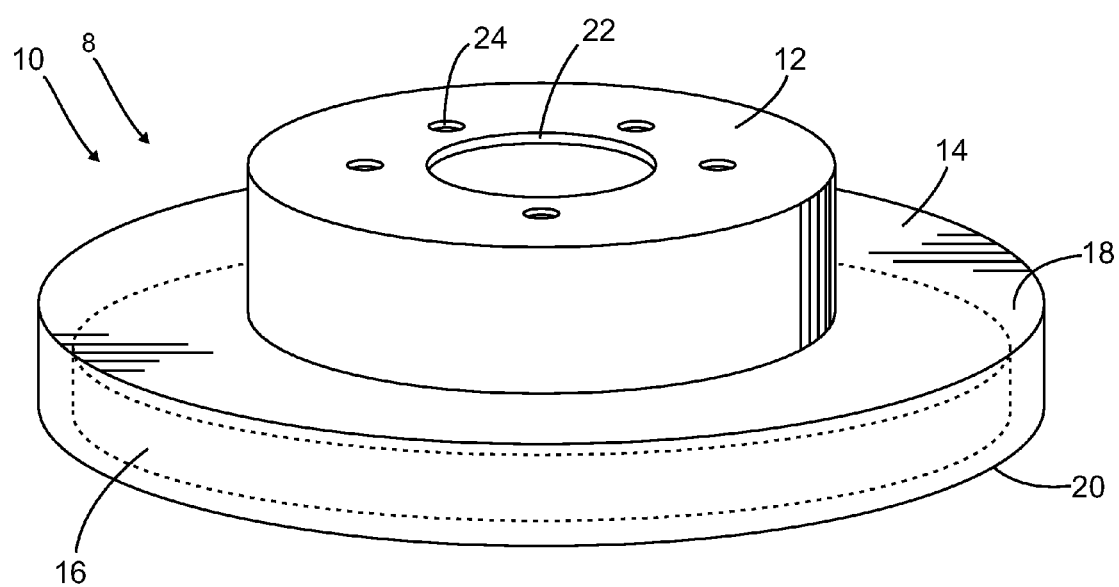
FIG. 1 illustrates a part according to one embodiment of the invention.

Referring to FIG. 1, one embodiment of the invention may include a part or product 8. In one embodiment, the part 8 may be, but is not limited to, one of a brake rotor, bracket, pulley, brake drum, transmission housing, gear, motor housing, shaft, bearing, engine, baseball bat, lathe machine, milling machine, drilling machine, or grinding machine. In one embodiment, the part 8 may be a rotor assembly 10. The rotor assembly 10 may include a hub portion 12, an annular portion 14, and an insert 16 (shown in phantom). In one embodiment, the insert 16 may be completely enclosed in the annular portion 14. The annular portion 14 may include a first face 18 and an opposite second face 20. In one embodiment, the hub portion 12 may have a central aperture 22 formed therein. The hub portion 12 may also include a plurality of bolt holes 24. In another embodiment, the rotor assembly 10 may be vented and the first face 18 and the second face 20 may be separated by a plurality of vanes (not shown). The hub portion 12 and the annular portion 14 may comprise at least one of aluminum, steel, stainless steel, cast iron, metal matrix composites, or other alloys.

Figure 2:
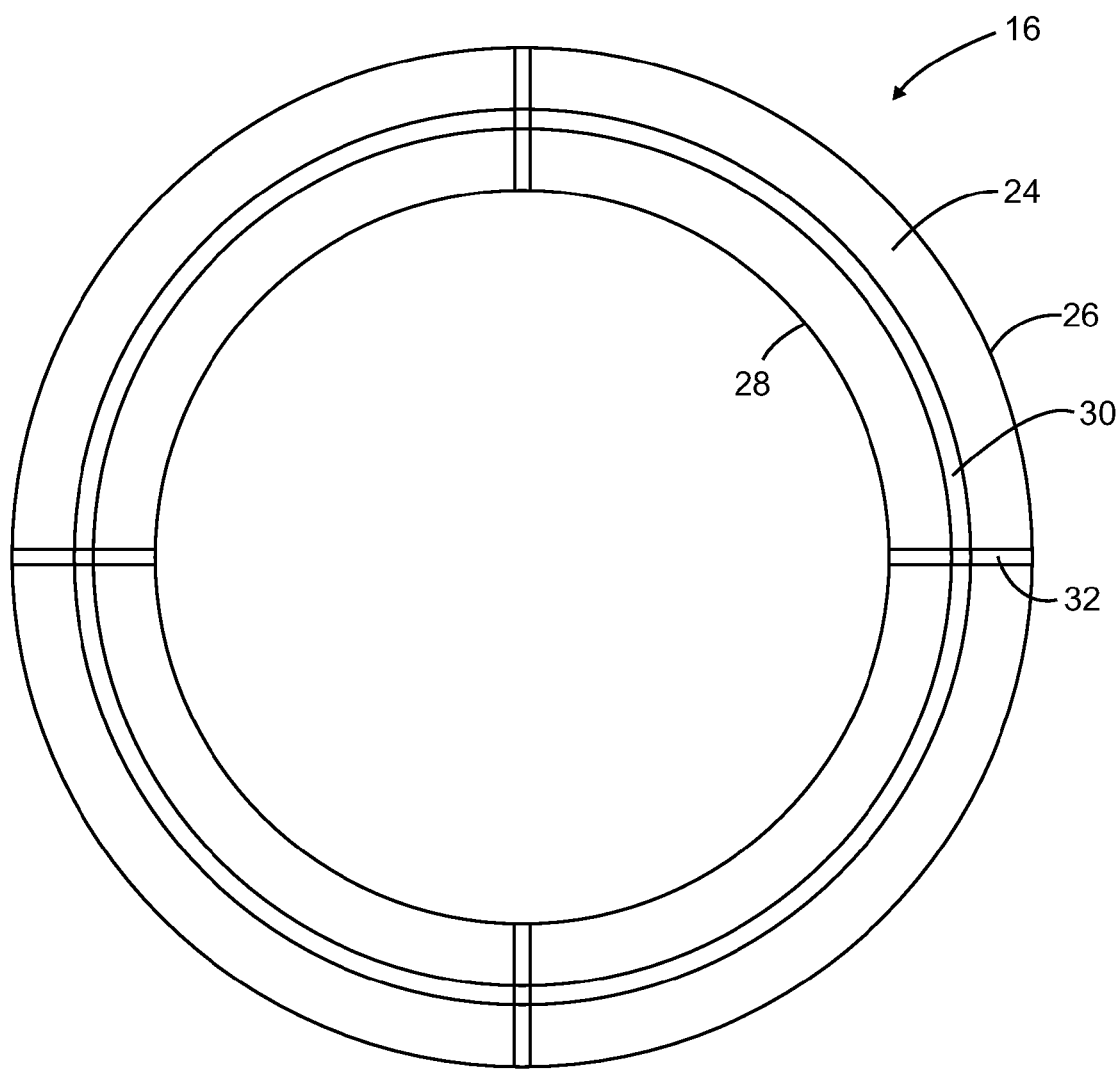
FIG. 2 illustrates an insert, according to one embodiment of the invention.
Figure 3:
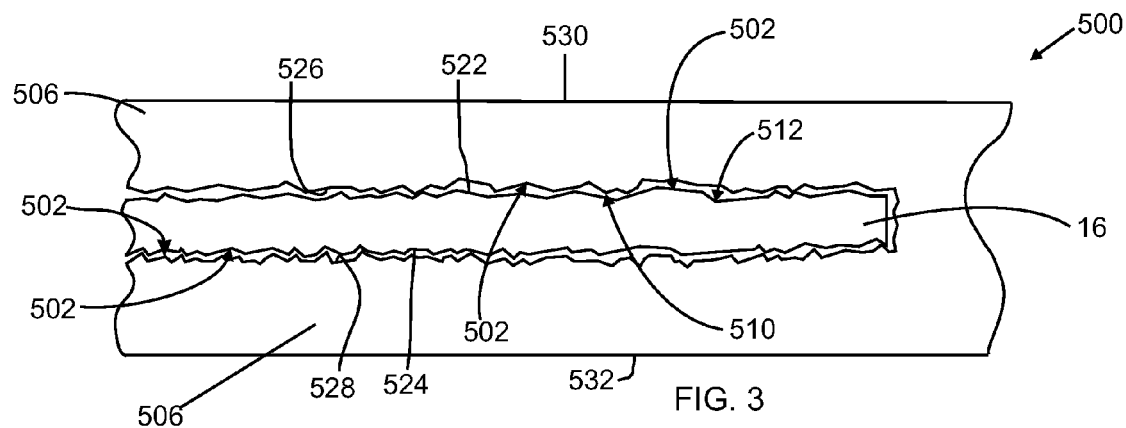
FIG. 3 is a sectional view with portions broken away of one embodiment of the invention including an insert.

Referring to FIG. 2, the insert 16 is shown according to one embodiment of the invention. The insert 16 may provide damping in a part subject to vibration. In various embodiments, the insert 16 may have various geometric configurations. In one embodiment, the insert 16 has an annular body 24 comprising an outer edge 26 (at an outer diameter of the annular body 24) and an inner edge 28 (at an inner diameter of the annular body 24).

In another embodiment not shown, the insert 16 may include a plurality of tabs extending from at least one of the inner edge 28 or the outer edge 26 of the annular body 24.

In one embodiment shown in FIG. 2, the insert 16 may include an annular stiffening rib 30 in the annular body 24. The annular stiffening rib 30 may be approximately equidistant from the inner edge 28 and the outer edge 26. In another embodiment, the insert 16 includes a plurality of radial stiffening ribs 32, which extend from the inner edge 28 of the annular body 24 to the outer edge 26. In one embodiment, the insert 16 may include multiple segments. In another embodiment, the insert 16 may include lateral stiffening ribs.

Referring to FIGS. 3-18, one embodiment of the invention includes a product or part 500 having a frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally damping a vibrating part. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the movement of the frictional surfaces 502 against each other. The movement of frictional surfaces 502 against each other may include the movement of: surfaces of the body 506 of the part against each other; a surface of the body 506 of the part against a surface of the insert 504 (also referred to as 16 herein); a surface of the body 506 of the part against the layer 520; a surface of the insert 504 against the layer 520; a surface of the body 506 of the part against the particles 514 or fibers; a surface of the insert 504 against the particles 514 or fibers; or by frictional movement of the particles 514 or fibers against each other or against remaining binder material.

In embodiments wherein the frictional surface 502 is provided as a surface of the body 506 or the insert 16 or a layer 520 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 16 may be an annular body and the area of frictional contact on a frictional surface 502 may extend in an annular direction a distance ranging from about 20 mm to about 1000 mm and in a transverse direction ranging from about 10 mm to about 75 mm. The frictional surface 502 may be provided in a variety of embodiments, for example, as illustrated in FIGS. 3-18.

Referring again to FIG. 3, in another embodiment of the invention one or more of the outer surfaces 522, 524 of the insert 16 or surfaces 526, 528 of the body 506 of the part 500 may include a relatively rough surface including a plurality of peaks 510 and valleys 512 to enhance the frictional damping of the part. In one embodiment, the surface of the insert 16 or the body 506 may be abraded by sandblasting, glass bead blasting, water jet blasting, chemical etching, machining or the like.

Figure 4:
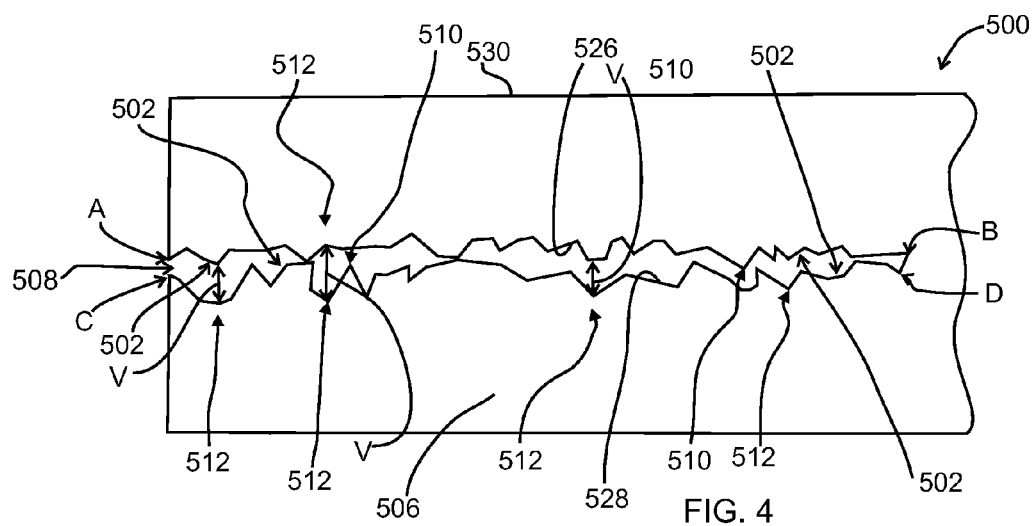
FIG. 4 is a sectional view with portions broken away of one embodiment of the invention including two spaced apart frictional surfaces of a cast metal body portion.

As shown in FIG. 4, in one embodiment one frictional surface 502 (for example extending from points A-B) may be a first surface of the body 506 of the part 500 positioned adjacent to a second frictional surface 502 (for example extending from points C-D) of the body 506. The body 506 may include a relatively narrow slot-like feature 508 formed therein so that at least two of the frictional surfaces 502 defining the slot-like feature 508 may engage each other for frictional movement during vibration of the part to provide frictional damping of the part 500. In various embodiments of the invention, the slot-like feature 508 may be formed by machining the cast part, or by using a sacrificial casting insert that may be removed after the casting by, for example, etching or machining. In one embodiment a sacrificial insert may be used that can withstand the temperature of the molten metal during casting but is more easily machined than the cast metal. Each frictional surface 502 may have a plurality of peaks 510 and a plurality of valleys 512. The depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the opposing frictional surfaces 502 during component operation for frictional damping to occur.

In another embodiment of the invention the damping means or frictional surface 502 may be provided by particles 514 or fibers provided on at least one face of the insert 16 or a surface of the body 506 of the part 500. The particles 514 may have an irregular shape (e.g., not smooth) to enhance frictional damping, as illustrated in FIG. 12. One embodiment of the invention may include a layer 520 including the particles 514 or fibers which may be bonded to each other or to a surface of the body 506 of the part or a surface of the insert 16 due to the inherent bonding properties of the particles 514 or fibers. For example, the bonding properties of the particles 514 or fibers may be such that the particles 514 or fibers may bind to each other or to the surfaces of the body 506 or the insert 16 under compression. In another embodiment of the invention, the particles 514 or the fibers may be treated to provide a coating thereon or to provide functional groups attached thereto to bind the particles together or attach the particles to at least one of a surface of the body 506 or a surface of the insert 16. In another embodiment of the invention, the particles 514 or fibers may be embedded in at least one of the body 506 of the part or the insert 16 to provide the frictional surface 502 (FIGS. 7-8).

In embodiments wherein at least a portion of the part 500 is manufactured such that the insert 504 and/or the particles 514 or fibers are exposed to the temperature of a molten material such as in casting, the insert 504 and/or particles 514 or fibers may be made from materials capable of resisting flow or resisting significant erosion during the manufacturing. For example, the insert 504 and/or the particles 514 or fibers may include refractory materials capable of resisting flow or that do not significantly erode at temperatures above 1100° F., above 2400° F., or above 2700° F. When molten material, such as metal, is cast around the insert 504 and/or the particles 514, the insert 504 or the particles 514 should not be wet by the molten material so that the molten material does not bond to the insert 504 or layer 520 at locations wherein a frictional surface 502 for providing frictional damping is desired.

Illustrative examples of suitable particles 514 or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles 514 may have a length along the longest dimension thereof ranging from about 1 µm-350 µm, or 10 µm-250 µm.

In embodiments wherein the part 500 is made using a process wherein the insert 16 and/or the particles 514 or fibers are not subjected to relatively high temperatures associated with molten materials, the insert 16 and/or particles 514 or fibers may be made from a variety of other materials including, but not limited to, non-refractory polymeric materials, ceramics, composites, wood or other materials suitable for frictional damping. For example, such non-refractory materials may also be used (in additional to or as a substitute for refractory materials) when two portions of the body 506 of the part 500 are held together mechanically by a locking mechanism, or by fasteners, or by adhesives, or by welding 518, as illustrated in FIG. 6.

In another embodiment of the invention, the layer 520 may be a coating over the body 506 of the part or the insert 16. The coating may include a plurality of particles 514 which may be bonded to each other and/or to the surface of the body 506 of the part or the insert 16 by an inorganic or organic binder 516 (FIGS. 5-6, 11) or other bonding materials. Illustrative examples of suitable binders include, but are not limited to, epoxy resins, phosphoric acid binding agents, calcium aluminates, sodium silicates, wood flour, or clays. In another embodiment of the invention the particles 514 may be held together and/or adhered to the body 506 or the insert 16 by an inorganic binder. In one embodiment, the coating may be deposited on the insert 16 or body 506 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include IronKote. In one embodiment, a liquid coating may be deposited on a portion of the insert and may include high temperature Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

When the layer 520 including particles 514 or fibers is provided over the insert 16 or the body 506 of the part the thickness L (FIG. 5) of the layer 520, particles 514 and/or fibers may vary. In various embodiments, the thickness L of the layer 520, particles 514 and/or fibers may range from about 1 µm-400 µm, 10 µm-400 µm, 30 µm-300 µm, 30 µm-40 µm, 40 µm-100 µm, 100 µm-120 µm, 120 µm-200 µm, 200 µm-300 µm, 200 µm-250 µm, or variations of these ranges.

In yet another embodiment of the invention the particles 514 or fibers may be temporarily held together and/or to the surface of the insert 16 by a fully or partially sacrificial coating. The sacrificial coating may be consumed by molten metal or burnt off when metal is cast around or over the insert 16. The particles 514 or fibers are left behind trapped between the body 506 of the cast part and the insert 16 to provide a layer 520 consisting of the particles 514 or fibers or consisting essentially of the particles 514 or fibers.

Figure 5:
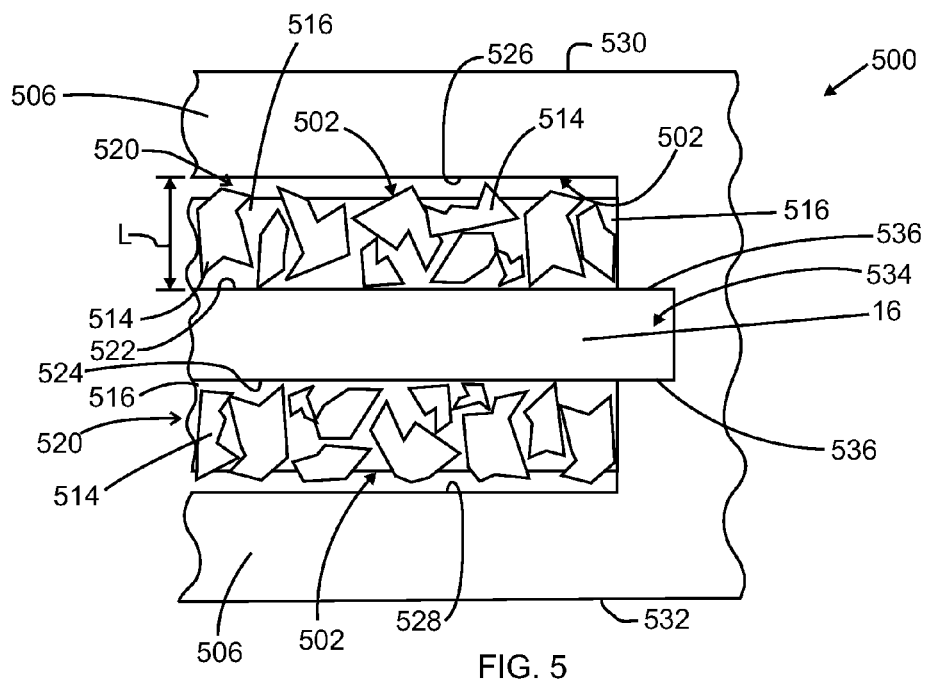
FIG. 5 is a sectional view with portions broken away of one embodiment of the invention including an insert having a layer thereon to provide a frictional surface or damping.

The layer 520 may be provided over the entire insert 16 or only over a portion thereof. In one embodiment of the invention the insert 16 may include a tab 534 (FIG. 5). For example, the insert 16 may include an annular body portion and a tab 534 extending radially inward or outward therefrom. In one embodiment of the invention at least one wettable surface 536 of the tab 534 does not include a layer 520 including particles 514 or fibers, or a wettable material such as graphite is provided over the tab 534, so that the cast metal is bonded to the wettable surface 536 to attach the insert 16 to the body 506 of the part 500 but still allow for frictional damping over the remaining insert surface which is not bonded to the casting.

In one embodiment of the invention at least a portion of the insert 16 is treated or the properties of the insert 16 are such that molten metal will not wet or bond to that portion of the insert 16 upon solidification of the molten metal. According to one embodiment of the invention at least one of the body 506 of the part or the insert 16 includes a metal, for example, but not limited to, aluminum, steel, stainless steel, cast iron, any of a variety of other alloys, or metal matrix composite including abrasive particles. In one embodiment of the invention the insert 16 may include a material such as a metal having a higher melting point than the melting point of the molten material being cast around a portion thereof.

In one embodiment the insert 16 may have a minimum average thickness of 0.2 mm and/or a minimum width of 0.1 mm and/or a minimum length of 0.1 mm. In another embodiment the insert 16 may have a minimum average thickness of 0.2 mm and/or a minimum width of 2 mm and/or a minimum length of 5 mm. In other embodiments the insert 16 may have a thickness ranging from about 0.1-20 mm, 0.1-6.0 mm, or 1.0-2.5 mm, or ranges therebetween.

Referring now to FIGS. 9-10, again the frictional surface 502 may have a plurality of peaks 510 and a plurality of valleys 512. The depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the body 506 and the insert 16 during component operation for frictional damping to occur.

In other embodiments of the invention improvements in the frictional damping may be achieved by adjusting the thickness (L, as shown in FIG. 5) of the layer 520, or by adjusting the relative position of opposed frictional surfaces 502 or the average depth of the valleys 512 (for example, as illustrated in FIG. 4).

In one embodiment the insert 16 is not pre-loaded or under pre-tension or held in place by tension. In one embodiment the insert 16 is not a spring. Another embodiment of the invention includes a process of casting a material comprising a metal around an insert 16 with the proviso that the frictional surface 502 portion of the insert used to provide frictional damping is not captured and enclosed by a sand core that is placed in the casting mold. In various embodiments the insert 16 or the layer 520 includes at least one frictional surface 502 or two opposite friction surfaces 502 that are completely enclosed by the body 506 of the part. In another embodiment the layer 520 including the particles 514 or fibers that may be completely enclosed by the body 506 of the part or completely enclosed by the body 506 and the insert 16, and wherein at least one of the body 506 or the insert 16 comprises a metal or consists essentially of a metal. In one embodiment of the invention the layer 520 and/or insert 16 does not include or is not carbon paper or cloth.

Referring again to FIGS. 2-6, in various embodiments of the invention the insert 16 may include a first face 522 and an opposite second face 524 and the body 506 of the part may include a first inner face 526 adjacent the first face 522 of the insert 16 constructed to be complementary thereto, for example nominally parallel thereto. The body 506 of the part includes a second inner face 528 adjacent to the second face 524 of the insert 16 constructed to be complementary thereto, for example parallel thereto. The body 506 may include a first outer face 530 overlying the first face 522 of the insert 16 constructed to be complementary thereto, for example parallel thereto. The body 506 may include a first outer face 532 overlying the second face 524 of the insert 16 constructed to be complementary thereto, for example parallel thereto. However, in other embodiments of the invention the outer faces 530, 532 of the body 506 are not complementary to associated faces 522, 524 of the insert 16. When the damping means is provided by a narrow slot-like feature 508 formed in the body 506 of the part 500, the slot-like feature 508 may be defined in part by a first inner face 526 and a second inner face 528 which may be constructed to be complementary to each other, for example parallel to each other. In other embodiments the surfaces 526 and 528; 526 and 522; or 528 and 524 are mating surfaces but not parallel to each other.

Figure 13:
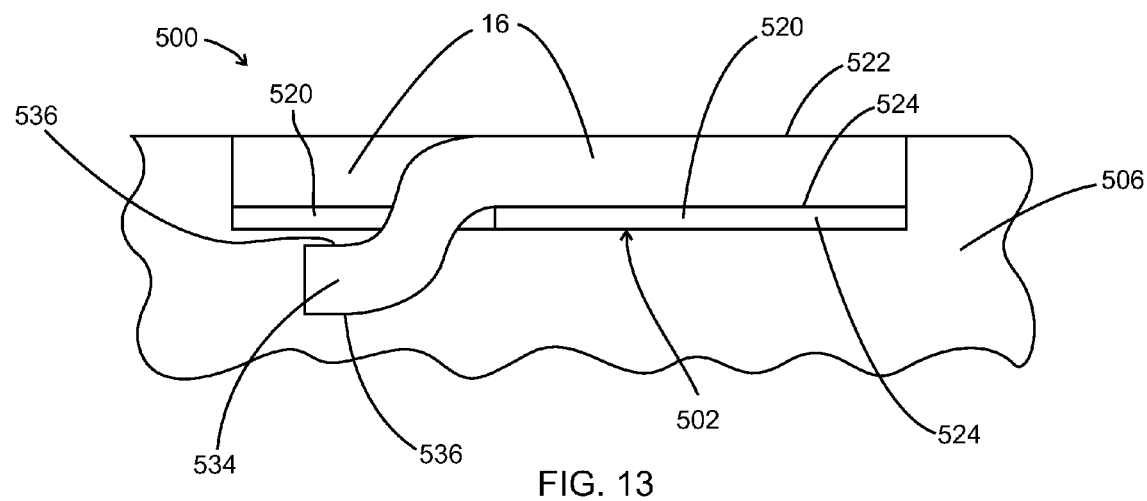
FIG. 13 is a sectional view with portions broken away of one embodiment of the invention.
Figure 14:
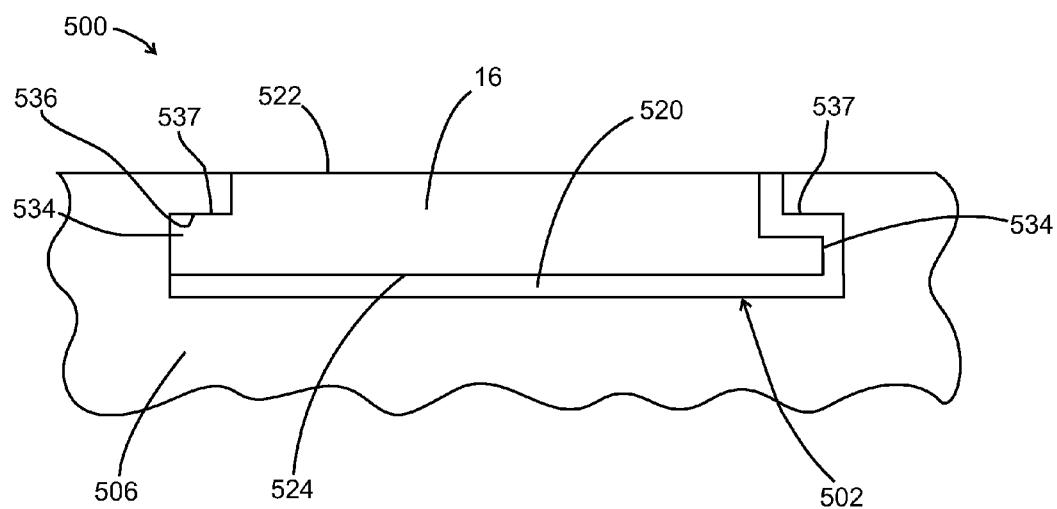
FIG. 14 is a sectional view with portions broken away of one embodiment of the invention.

Referring to FIGS. 13-14, in one embodiment of the invention the insert 16 may be an inlay wherein a first face 522 thereof is not enclosed by the body 506 of the part. The insert 16 may include a tang or tab 534 which may be bent downward as shown in FIG. 13. In one embodiment of the invention a wettable surface 536 may be provided that does not include a layer 520 including particles 514 or fibers, or a wettable material such as graphite is provided over the tab 534, so that the cast metal is bonded to the wettable surface 536 to attach the insert 16 to the body of the part but still allow for frictional damping on the non-bonded surfaces. A layer 520 including particles 514 or fibers may underlie the portion of the second face 524 of the insert 16 not used to make the bent tab 534.

In another embodiment the insert 16 includes a tab 534 which may be formed by machining a portion of the first face 522 of the insert 16 (FIG. 14). The tab 534 may include a wettable surface 536 having cast metal bonded thereto to attach the insert 16 to the body of the part but still allow for friction damping by way of the non-bonded surfaces. A layer 520 including particles 514 or fibers may underlie the entire second face 524 or a portion thereof. In other embodiments of the invention all surfaces including the tabs 534 may be non-wettable, for example by way of a coating 520 thereon, and features of the body portion 506 such as, but not limited to, a shoulder 537 may be used to hold the insert 16 in place.

Figure 15:
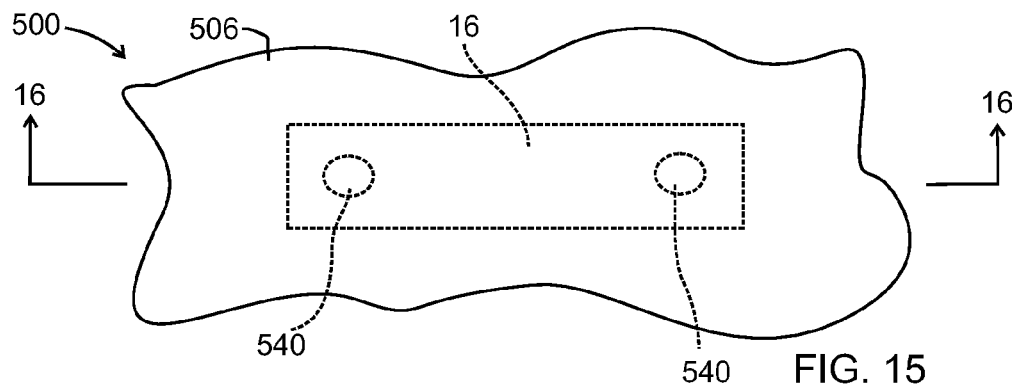
FIG. 15 is a plan view with portions broken away illustrating one embodiment of the invention.

Referring now to FIG. 15, one embodiment of the invention may include a part 500 having a body portion 506 and an insert 16 enclosed by the body part 506. The insert 16 may include through holes formed therein so that a stake or post 540 extends into or through the insert 16.

Figure 16:
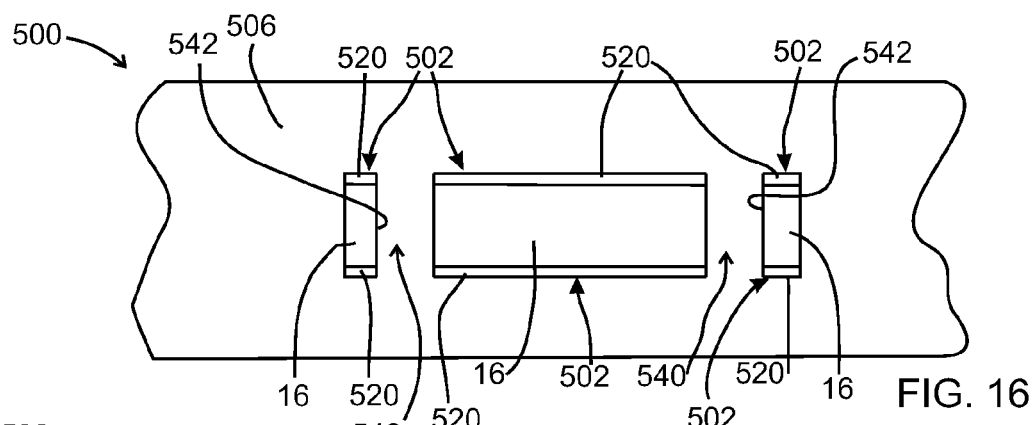
FIG. 16 is a sectional view taken along line 16-16 of FIG. 15 illustrating one embodiment of the invention.

Referring to FIG. 16, which is a sectional view of FIG. 15 taken along line 16-16, in one embodiment of the invention a layer 520 including a plurality of particles 514 or fibers (not shown) may be provided over at least a portion of the insert 16 to provide a frictional surface 502 and to prevent bonding thereto by cast metal. The insert 16 including the layer 520 may be placed in a casting mold and molten metal may be poured into the casting mold and solidified to form the post 540 extending through the insert 16. An inner surface 542 defining the through hole of the insert 16 may be free of the layer 520 or may include a wettable material thereon so that the post 540 is bonded to the insert 16. Alternatively, in another embodiment the post 16 may not be bonded the insert 16 at the inner surface 542. The insert 16 may include a feature such as, but not limited to, a shoulder 505 and/or the post 540 may include a feature such as, but not limited to, a shoulder 537 to hold the insert in place.

Figure 17:
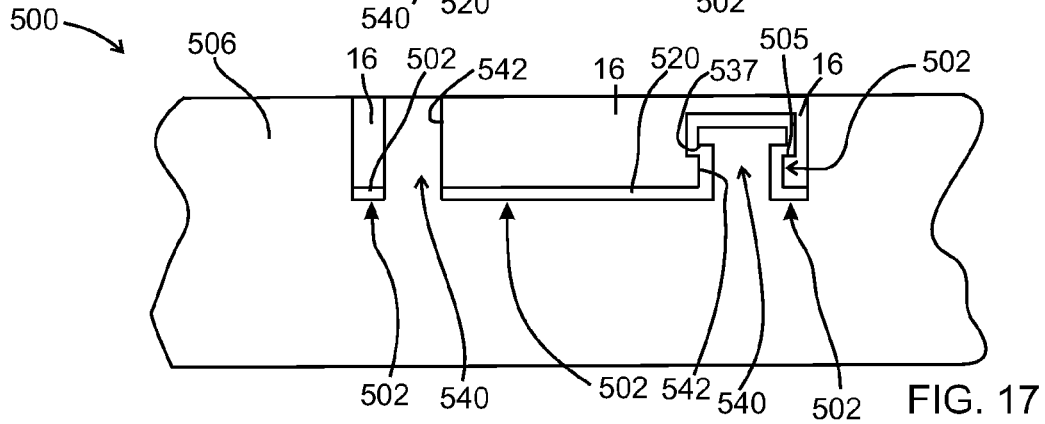
FIG. 17 is a sectional view with portions broken away illustrating one embodiment of the invention.

Referring now to FIG. 17, in another embodiment, the insert may be provided as an inlay in a casting including a body portion 506 and may include a post 540 extending into or through the insert 16. The insert 16 may be bonded to the post 540 to hold the insert in place and still allow for frictional damping. In one embodiment of the invention the insert 16 may include a recess defined by an inner surface 542 of the insert 16 and a post 540 may extend into the insert 16 but not extend through the insert 16. In one embodiment the post 16 may not be bonded to the insert 16 at the inner surface 542. The insert 16 may include a feature such as, but not limited to, a shoulder 505 and/or the post 540 may include a feature such as, but not limited to, a shoulder 537 to hold the insert in place.

Figure 18:
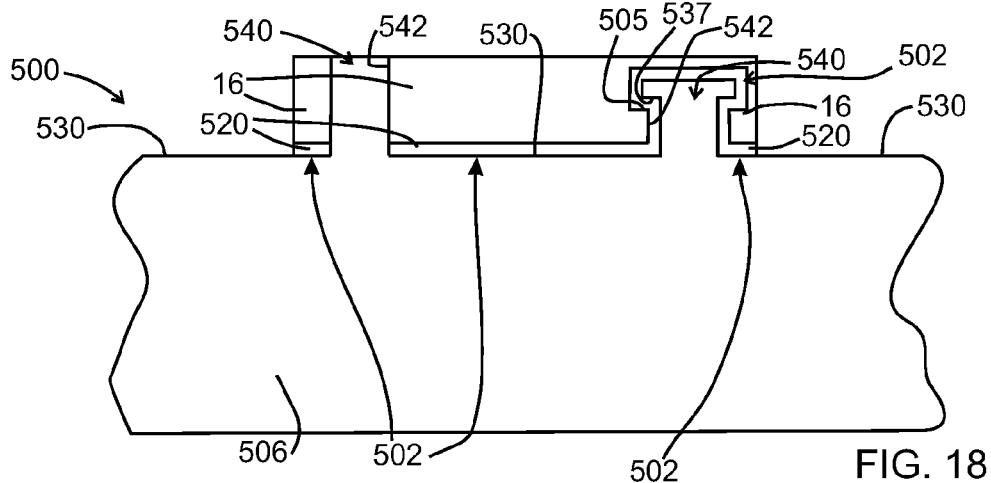
FIG. 18 is a sectional view, with portions broken away illustrating another embodiment of the invention.

Referring now to FIG. 18, in another embodiment of the invention, an insert 16 or substrate may be provided over an outer surface 530 of the body portion 506. A layer 520 may or may not be provided between the insert 16 and the outer surface 530. The insert 16 may be constructed and arranged with through holes formed therethrough or a recess therein so that cast metal may extend into or through the insert 16 to form a post 540 to hold the insert in position and still allow for frictional damping. The post 540 may or may not be bonded to the insert 16 as desired. The post 540 may extend through the insert 16 and join another portion of the body 506 if desired.

Referring now to FIGS. 19-22, a method of manufacturing the part 8, for example the rotor assembly 10, is provided according to one embodiment of the invention. A first portion 34 of the rotor assembly 10 and a second portion 40 of the rotor assembly 10 are provided. The first portion 34 may comprise the hub portion 12. When the first portion 34 and the second portion 40 are closed together, a cavity 35 is formed. The insert 16 may be positioned between the first portion 34 and the second portion 40 of the rotor assembly 10. The cavity 35 may receive the insert 16. The shape of the first portion 34 and the second portion 40 is not limited to the embodiments shown in FIGS. 19-22. The first portion 34 and the second portion 40 may be of any suitable shape such that when the portions 34 and 40 are closed together, the cavity 35 is formed and the combined portions 34 and 40 form the part 8.

Still referring to FIGS. 19-22, the first portion 34 and the second portion 40 may be joined together in any suitable way. The first portion 34 and the second portion 40 may be joined, for example, by welding, brazing, or mechanical interlocking 518 (at 52, 54, 56, 58, 60, or 62 in FIGS. 19-22). In one embodiment, the first portion 34 and the second portion 40 are joined by friction welding. In one embodiment, friction welding may include the generation of heat through mechanical friction between two components, wherein one component is in motion and one component is stationary, and wherein pressure may be applied to the two components. In one embodiment, the first portion 34 and the second portion 40 are joined by inertia welding. In one embodiment, inertia welding may include holding one work piece component in a flywheel assembly, accelerating the assembly to a predetermined speed, disconnecting the flywheel from the power supply, and bringing the rotating work piece into contact with a stationary work piece under a constant force. In one embodiment, the first portion 34 and the second portion 40 are joined by arc welding. In one embodiment, arc welding may include creating an electric arc between an electrode and a work piece to melt the metals at a joint. In one embodiment, the first portion 34 and the second portion 40 are joined by resistance welding, which may include joining surfaces by the heat generated by resistance to the flow of electric current through work pieces. In another embodiment, the first portion 34 and the second portion 40 are joined by deformation resistance welding. In one embodiment, deformation resistance welding may include two electrodes applying electric current and mechanical force to a joint, wherein current passing through electrical resistance at the interface heats the area to form a weld. In another embodiment, deformation resistance welding may include heating metal surfaces to the point of softening followed by rapid compression of the joint. In one embodiment, the first portion 34 and the second portion 40 are joined by brazing, which may include joining components by melting a filler metal or alloy that is placed between the components and has a lower melting point than the components.

In one embodiment, the first portion 34 and second portion 40 are connected together by means other than casting one of the first portion 34 or the second portion 40 around a portion of the other. In yet another embodiment, the first portion 34 and the second portion 40 are joined using rivets or fasteners. In another embodiment, an interface layer 50 may be provided and may include at least one of silver electroplates, thin foils of copper, nickel, other material that will reduce intermetallics that form during welding, or other material that provides a reinforcement. In various embodiments, joining of the first portion 34 and the second portion 40 may also provide a corrosion seal to protect the insert 16 from moisture or salt penetration during the usage of the rotor assembly 10.

In one embodiment a layer 520 may be provided over at least a portion of the insert 16. In one embodiment a plurality of inserts 16 may be used from a sectioned annular body. The first portion 34 and the second portion 40 of the rotor assembly 10 may comprise at least one of aluminum, steel, stainless steel, cast iron, metal matrix composites, or other alloys.

Figure 19:
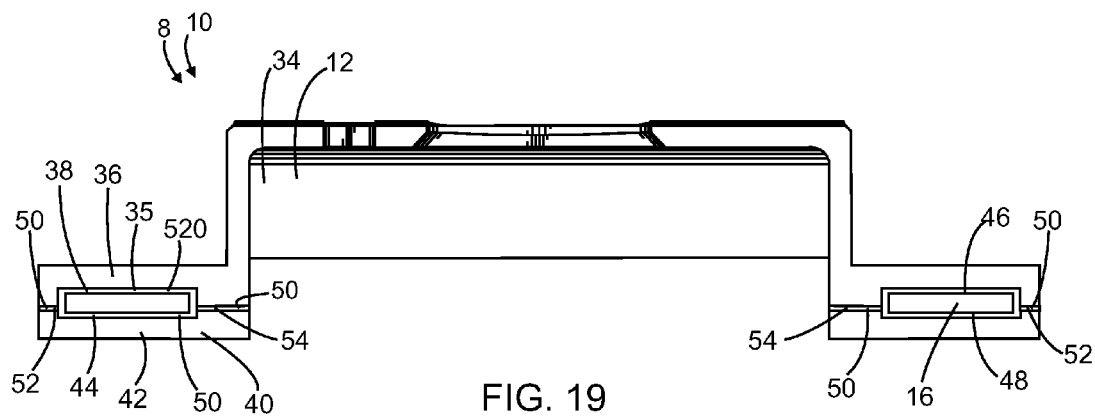
FIG. 19 illustrates a method of manufacturing a part, according to one embodiment of the invention.

In one embodiment shown in FIG. 19, the first portion 34 may comprise a first annular portion 36 and a first cavity 38. The first cavity 38 may be located in the first annular portion 36. The second portion 40 of the rotor assembly 10 may comprise a second annular portion 42 and a second cavity 44. The second cavity 44 may be located in the second annular portion 42. The first cavity 38 and the second cavity 44 together form the cavity 35. In one embodiment, the insert 16 may be at least partially received or completely received in at least one of the first cavity 38 or the second cavity 44 formed in the first portion 34 or second portion 40.

Still referring to FIG. 19, the first portion 34 and the second portion 40 may be closed together so that the insert 16 is in at least one of the first cavity 38 or the second cavity 44. A first face 46 of the insert 16 may face the first portion 34 and a second face 48 may face the second portion 40. The first portion 34 and the second portion 40 of the rotor assembly 10 are then joined together to enclose the insert 16 in the first cavity 38 and the second cavity 44. The first portion 34 and the second portion 40 may be joined in a first region 52 and a second region 54. In one embodiment, the interface layer 50 may be provided in at least one of the first region 52 or the second region 54.

Figure 20:
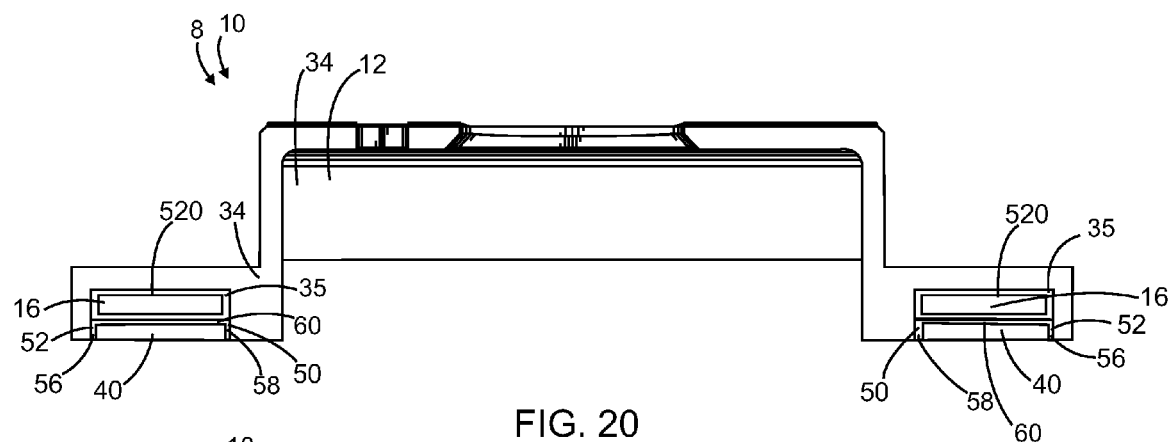
FIG. 20 illustrates a method of manufacturing a part, according to one embodiment of the invention.
Figure 21:
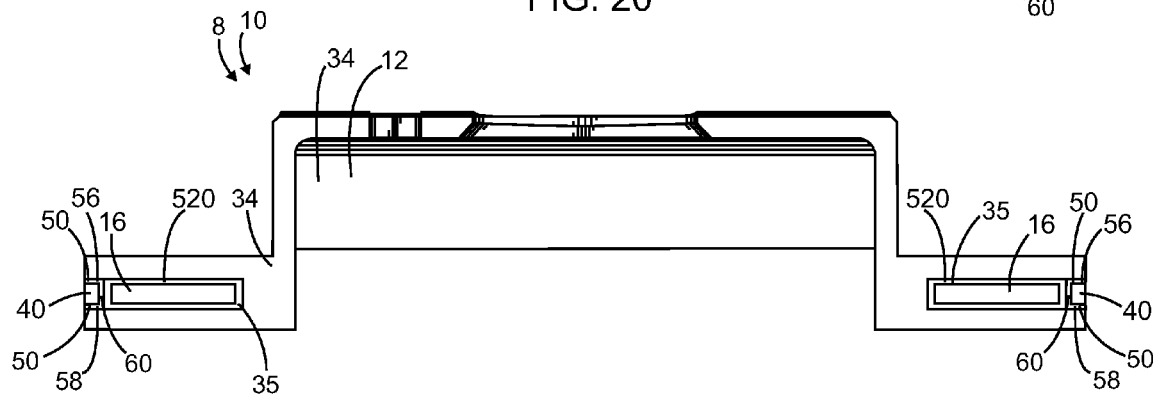
FIG. 21 illustrates a method of manufacturing a part, according to one embodiment of the invention.

Referring to FIGS. 20-21, in one embodiment, the first portion 34 and the second portion 40 may be joined in at least one of a first region 56, a second region 58, or a third region 60 (if desired). In another embodiment, the interface layer 50 is provided on at least a portion of at least one of the first region 56 or the second region 58 before the first portion 34 and the second portion 40 are joined.

Figure 22:
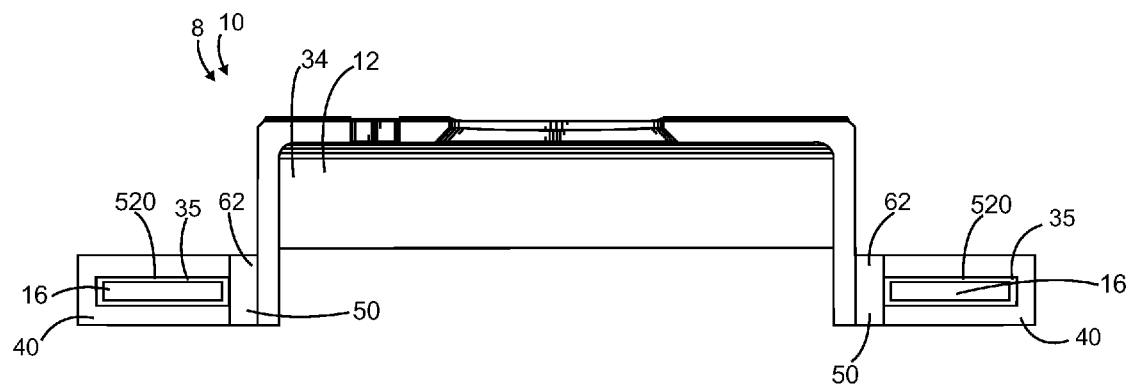
FIG. 22 illustrates a method of manufacturing a part, according to one embodiment of the invention.

In one embodiment shown in FIG. 22, the first portion 34 and the second portion 40 are joined by spin welding. The first portion 34 and the second portion 40 may be joined in a first region 62 by spin welding. In one embodiment, the interface layer 50 may be provided on at least a portion of the first region 62 before the first portion 34 and the second portion 40 are joined.

In another embodiment (not shown) providing a method of manufacturing a vented rotor assembly, the second portion 40 of the rotor assembly 10 also includes a third annular portion that is separated from the second annular portion 42 by a plurality of vanes.

Figure 23:
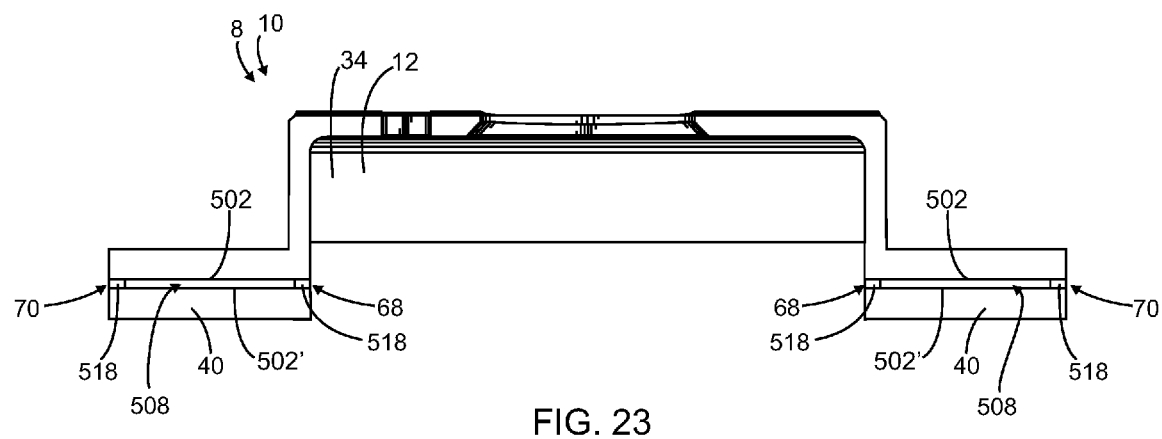
FIG. 23 illustrates a method of manufacturing a part, according to one embodiment of the invention.

Another embodiment shown in FIG. 23 does not have an insert 16. When the first portion 34 and the second portion 40 of the rotor assembly 10 are closed together, a frictional damping means comprising a first frictional surface 502 and a second frictional surface 502' is formed. As described above for FIGS. 19-22, the first portion 34 and the second portion 40 may be joined in various ways including welding, brazing, or mechanical interlocking 518. The first portion 34 and the second portion 40 may be joined near the inner edge 68 and near the outer edge 70 of the rotor assembly 10. In one embodiment, at least one of the first frictional surface 502 or the second frictional surface 502' may have a layer 520 (not shown). Another embodiment may include an inlay wherein discrete portions of the inlay are joined by welding, brazing, or mechanical interlocking. In one embodiment, the first frictional surface 502 and the second frictional surface 502' may provide a slot-like feature 508 as shown in FIG. 4 and described elsewhere herein. The dimensions of the slot-like feature 508 in FIG. 4 are exaggerated.

When the term "over," "overlying," overlies," "under," "underlying," or "underlies" is used herein to describe the relative position of a first layer or component with respect to a second layer or component such shall mean the first layer or component is directly on and in direct contact with the second layer or component or that additional layers or components may be interposed between the first layer or component and the second layer or component.

The above description of embodiments of the invention is merely exemplary in nature and, thus, variations thereof are not to be regarded as a departure from the spirit and scope of the invention.

What is claimed is:

1. A method comprising:
   providing a first portion of a part;
   providing a second portion of the part, and wherein at least one of the first portion or the second portion has at least a first cavity;
   providing a frictional damping insert constructed and arranged to provide frictional damping of the part, the insert having thereon a coating comprising at least one of particles or fibers;
   positioning the insert so that at least a portion of the insert is received in the first cavity, and wherein frictional contact surfaces are provided by at least one of the first portion of the part or the second portion of the part and at least one of the insert, the coating on the insert, or the particles or the fibers, the frictional contact surfaces being constructed and arranged so that at least a portion of the frictional contact surfaces move against each other in frictional contact during vibration of the part so that the frictional contact damps vibration of the part; and joining the first portion and the second portion of the part to enclose the insert, wherein the insert and at least one of the first portion or second portion are in frictional contact so that the insert moves relative to at least one of the first portion or second portion of the part to provide the frictional damping.

2. A method as set forth in claim 1 wherein the first portion of the part comprises a hub portion and a first annular portion.

3. A method as set forth in claim 1 wherein the second portion of the part comprises a second annular portion.

4. A method as set forth in claim 1 wherein the joining the first portion and the second portion of the part comprises welding.

5. A method as set forth in claim 1 wherein the joining the first portion and the second portion of the part comprises friction welding.

6. A method as set forth in claim 1 wherein the joining the first portion and the second portion of the part comprises resistance welding.

7. A method as set forth in claim 1 wherein the joining the first portion and the second portion of the part comprises deformation resistance welding.

8. A method as set forth in claim 1 wherein the joining the first portion and the second portion of the part comprises spin welding.

9. A method as set forth in claim 1 wherein the joining the first portion and the second portion of the part comprises arc welding.

10. A method as set forth in claim 1 wherein the joining the first portion and the second portion of the part comprises inertia welding.

11. A method as set forth in claim 1 wherein the joining the first portion and the second portion of the part comprises brazing.

12. A method as set forth in claim 1 further comprising providing an interface layer on at least a portion of at least one of the first portion or the second portion.

13. A method as set forth in claim 12 wherein the interface layer comprises at least one of a silver electroplate, a thin foil of copper, nickel, other material that will reduce intermetallics that form during welding, or other material that provides a reinforcement.

14. A method as set forth in claim 1 wherein the joining the first portion and the second portion of the part comprises joining with rivets.

15. A method as set forth in claim 1 wherein the joining the first portion and the second portion of the part comprises joining with fasteners.

16. A method as set forth in claim 1 wherein the coating comprises at least one of silica, alumina, graphite with clay, silicon carbide, silicon nitride, cordierite (magnesium-iron-aluminum silicate), mullite (aluminum silicate), zirconia (zirconium oxide), phyllosilicates, other high-temperature-resistant particles, a lignosulfonate binder, cristobalite ($SiO_2$), quartz, calcium lignosulfonate, $Al_2O_3$, ceramic fibers, mineral fibers, epoxy resins, phosphoric acid binding agents, calcium aluminates, sodium silicates, wood flour, clays, non-refractory polymeric materials, ceramics, composites, wood, an inorganic binder, an organic binder, or a liquid dispersed mixture of alumina-silicate-based, organically bonded refractory mix.

17. A method as set forth in claim 1 wherein the thickness of the coating is about 10 µm to about 400 µm.

18. A method as set forth in claim 1 wherein the particles comprise irregularly shaped particles.

19. A method as set forth in claim 1 wherein the first portion and the second portion of the part comprise at least one of aluminum, steel, stainless steel, cast iron, metal matrix composites, or other alloys.

20. A method as set forth in claim 1 wherein the insert comprises at least one of aluminum, steel, stainless steel, cast iron, metal matrix composites, or other alloys.

21. A method as set forth in claim 1 wherein the insert comprises a non-metal.

22. A method as set forth in claim 1 wherein the part comprises one of a brake rotor, bracket, pulley, brake drum, transmission housing, gear, motor housing, shaft, bearing, engine, baseball bat, lathe machine, milling machine, drilling machine, or grinding machine.

23. A method as set forth in claim 1 wherein the insert is a separate and distinct piece from the first portion and the second portion of the part.

24. A method as set forth in claim 23 wherein the insert comprises a material that is different than a material of the first and second portions of the part.

25. A method as set forth in claim 1 wherein joining the first portion and the second portion results in a joined portion comprising materials of the first and second portions, and wherein the joined portion does not comprise a material of the insert.

26. A method as set forth in claim 1 wherein the first portion and the second portion comprises the same material.

27. A method as set forth in claim 1 further comprising after the joining, exciting the part to cause the part to undergo vibration and so that the vibration of the part causes the frictional contact surfaces to move against each other in frictional contact so that the frictional contact damps the vibration of the part.

28. A method as set forth in claim 1 wherein the frictional contact surfaces each comprising a plurality of peaks and valleys.

29. A method as set forth in claim 28 wherein the average depth of the valleys ranges from 1 µm-300 µm.

30. A method as set forth in claim 28 wherein the average depth of the valleys ranges from 100 µm-160 µm.

31. A method as set forth in claim 1 wherein each if the frictional contact surfaces extends a distance of at least 1 mm in a first direction and a distance of at least 1 mm in a second direction transverse to the first direction.

32. A method as set forth in claim 1 wherein the coating comprises an organically bonded refractory mix.

33. A method as set forth in claim 1 wherein the first cavity is defined by the first portion, and further comprising a second cavity defined by the second portion, wherein upon the joining of the first portion and the second portion the insert is received in the second cavity, and wherein the insert moves relative to both the first portion and the second portion.

34. A method as set forth in claim 1 wherein the insert frictionally moves against each of the first portion and the second portion.

35. A method comprising:
providing a first portion of a part;
providing a second portion of the part, and wherein at least one of the first portion or the second portion has at least a first cavity;
providing a frictional damping insert constructed and arranged to provide frictional damping of the part, the insert having thereon a coating comprising at least one of particles or fibers;
positioning the insert so that at least a portion of the insert is received in the first cavity, and wherein frictional contact surfaces are provided by at least one of the first portion of the part or the second portion of the part and at least one of the insert, the coating on the insert, the particles or the fibers, the frictional contact surfaces being constructed and arranged so that at least a portion of the frictional contact surfaces move against each other in frictional contact during vibration of the part so that the frictional contact damps vibration of the part; and joining the first portion and the second portion of the part to enclose the insert, wherein the insert or the insert with the coating thereon and both of the first portion and the second portion are in frictional contact so that the insert or the insert with the coating thereon moves relative to both of the first portion and second portion of the part to provide the frictional damping of the part.

* * * * *